(12) United States Patent
Taniguchi

(10) Patent No.: US 7,419,736 B2
(45) Date of Patent: Sep. 2, 2008

(54) MIXED ION CONDUCTOR

(75) Inventor: Noboru Taniguchi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 323 days.

(21) Appl. No.: 10/545,763

(22) PCT Filed: Aug. 30, 2004

(86) PCT No.: PCT/JP2004/012893

§ 371 (c)(1),
(2), (4) Date: Aug. 15, 2005

(87) PCT Pub. No.: WO2005/024850

PCT Pub. Date: Mar. 17, 2005

(65) Prior Publication Data

US 2006/0166068 A1 Jul. 27, 2006

(30) Foreign Application Priority Data

Sep. 3, 2003 (JP) .............................. 2003-311720

(51) Int. Cl.
*H01M 8/10* (2006.01)
*G01N 27/26* (2006.01)
*C01F 11/02* (2006.01)

(52) U.S. Cl. ............... 429/33; 204/424; 423/594.16
(58) Field of Classification Search ................. 429/33; 204/424; 423/594.16
See application file for complete search history.

(56) References Cited

U.S. PATENT DOCUMENTS

| 5,387,330 A | 2/1995 | Taniguchi et al. ............ 204/421 |
| 6,517,693 B2 | 2/2003 | Taniguchi ..................... 204/421 |
| 6,528,195 B1 | 3/2003 | Taniguchi ..................... 429/33 |

FOREIGN PATENT DOCUMENTS

| JP | 3-176700 | 7/1991 |
| JP | 5-17252 | 1/1993 |
| JP | 5-28820 | 2/1993 |
| JP | 6-186193 | 7/1994 |
| JP | 6-231611 | 8/1994 |
| JP | 8-327592 | 12/1996 |
| JP | 8327592 | * 12/1996 |
| JP | 9-295866 | 11/1997 |
| JP | 2000-302550 | 10/2000 |
| JP | 2001-307546 | 11/2001 |

* cited by examiner

*Primary Examiner*—Patrick Ryan
*Assistant Examiner*—Thomas H. Parsons
(74) *Attorney, Agent, or Firm*—Hamre, Schumann, Mueller & Larson, P.C.

(57) ABSTRACT

A mixed ionic conductor of the present invention includes a perovskite oxide of Ba, Ce, and In. The perovskite oxide is a crystalline compound expressed by $Ba(Ce_{1-x}In_x)_pO_3$, where x is 0.4 to 0.6 and p is 1 to 1.02. An electrochemical device of the present invention includes the mixed ionic conductor as a solid electrolyte. In the electrochemical device, electrons generated by an oxidation-reduction reaction are drawn in the thickness direction of the solid electrolyte. With this configuration, the present invention can provide a mixed ionic conductor that has high conductivity and high reliability, and an electrochemical device using the mixed ionic conductor.

15 Claims, 4 Drawing Sheets

MIXED ION CONDUCTOR

TECHNICAL FIELD

The present invention relates to a mixed ionic conductor suitable for an electrochemical device such as a fuel cell or sensor, and a device using the mixed ionic conductor.

BACKGROUND ART

A mixed ionic conductor has a long history, and so far various types of mixed ionic conductors have been developed. In particular, an oxide ionic conductor of a solid oxide (e.g., zirconia or cerium oxide) has been used for an electrochemical device such as a fuel cell or gas sensor. As a proton conductor, e.g., $SrCe_{1-x}M_xO_3$, $CaZr_{1-x}M_xO_3$, or $SrZr_{1-x}M_xO_3$ (M is a trivalent element and $0<x<1$, the same is true for the following compositions unless otherwise noted) has been known. Moreover, $BaCe_{1-x}M_xO_3$, which is an oxide of barium and cerium, has been reported as a mixed ionic conductor that conducts oxide ions and protons simultaneously. In particular, when M is Gd and x is 0.16 to 0.23, the mixed ionic conductor has higher conductivity (see JP 5(1993)-28820 A (Patent Document 1)).

Although many mixed ionic conductors have been found, only a few of them are put to practical use. At present, zirconia is used as an oxygen sensor, and $SrCe_{1-x}M_xO_3$ or $CaZr_{1-x}M_xO_3$ is used to detect the concentration of hydrogen in a smelting furnace. However, these mixed ionic conductors work in a limited environment and are not fully reliable. For example, when the mixed ionic conductors are boiled in water, they are decomposed over about 1 to 100 hours. Moreover, a change that is attributed to the decomposition of materials is observed at 85° C. and 85% RH (relative humidity). A conventionally known proton conductor of a perovskite oxide hardly can exist stably in high humidity. JP 2000-302550 A (Patent Document 2) discloses a mixed ionic conductor, particularly a perovskite oxide in view of stability in boiling water, such as $BaZr_{1-x-y}Ce_xM_yO_3$ or $BaZr_{1-x-y}Ce_xM_yO_3$ ($0.01 \leq y \leq 0.3$). However, the ionic conductivity is lower than $BaCe_{1-x}M_xO_3$.

JP 9(1997)-295866 A (Patent Document 3) discloses $Ba_{1-x}L_xCe_{1-y}M_yO_{3-\alpha}$ (L is Mg, Ca or Sr and M is La, Pr, Nd, Pm, Sm or Eu). JP 2001-307546 A (Patent Document 4) discloses $BaZr_{1-x}Ce_xO_{3-p}$. JP 6(1994)-231611 A (Patent Document 5) discloses $BaCe_{1-x}M_xO_{3-y}$. All of these crystals have the disadvantage of low conductivity at high temperatures.

The mixed ionic conductor of a solid oxide is used generally at high temperatures, and therefore is required to resist thermal shock. However, the conventional mixed ionic conductor of a perovskite oxide does not have sufficient mechanical strength and is susceptible to cracks caused by thermal shock.

Patent Document 1: JP 5(1993)-28820 A
Patent Document 2: JP 2000-302550 A
Patent Document 3: JP 9(1997)-295866 A
Patent Document 4: JP 2001-307546 A
Patent Document 5: JP 6(1994)-231611 A As described above, a reliable mixed ionic conductor, particularly a perovskite oxide proton conductor is rare. With the progress in development of an electrochemical device such as a fuel cell, there has been a growing demand for a mixed ionic conductor that can provide high conductivity and high reliability for use under harsh environments.

DISCLOSURE OF INVENTION

With the foregoing in mind, it is an object of the present invention to provide a mixed ionic conductor that has high conductivity and high reliability, and an electrochemical device using the mixed ionic conductor.

A mixed ionic conductor of the present invention includes a perovskite oxide of Ba, Ce, and In. The perovskite oxide is a crystalline compound expressed by $Ba(Ce_{1-x}In_x)_pO_3$, where x is 0.4 to 0.6 and p is 1 to 1.02.

An electrochemical device of the present invention includes the above mixed ionic conductor as a solid electrolyte. In the electrochemical device, electrons generated by an oxidation-reduction reaction are drawn in the thickness direction of the solid electrolyte.

DESCRIPTION OF THE INVENTION

Figure 1:
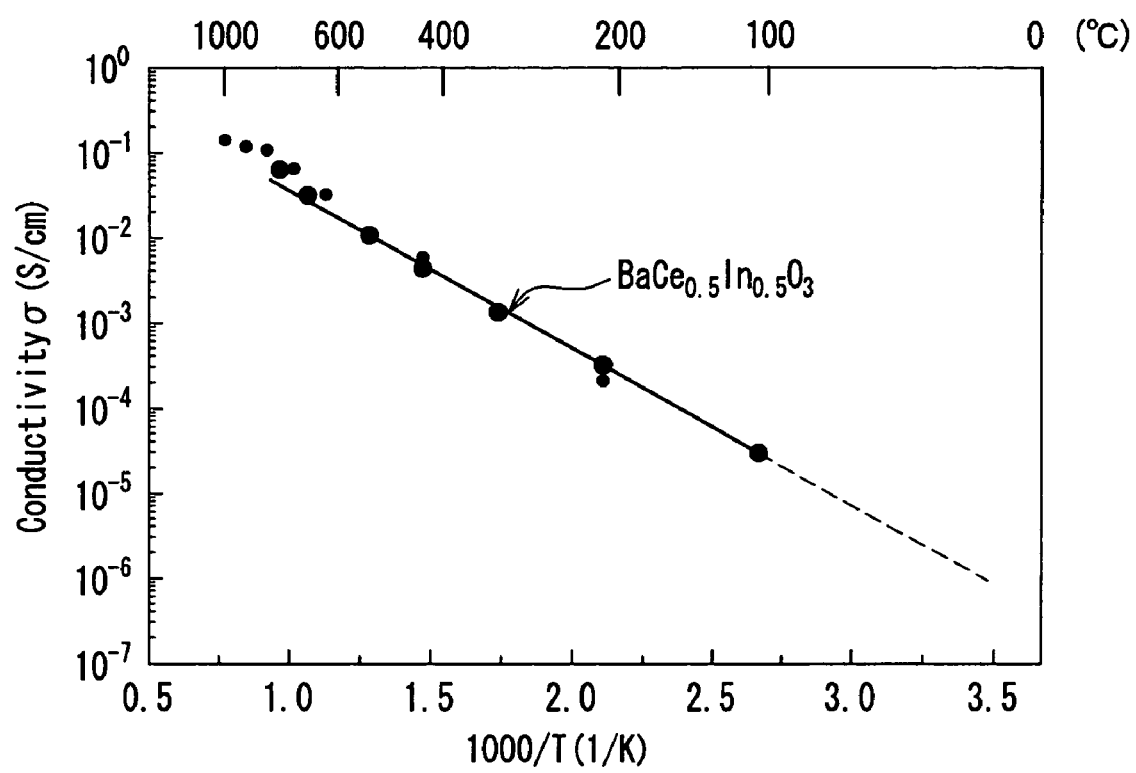
FIG. 1 shows an Arrhenius plot of conductivity in an embodiment of a mixed ionic conductor of the present invention.

A mixed ionic conductor of the present invention includes a perovskite oxide of Ba, Ce, and In. The perovskite oxide is a crystalline compound expressed by $Ba(Ce_{1-x}In_x)_pO_3$, where x is 0.4 to 0.6 and p is 1 to 1.02. For example, the perovskite oxide may have a composition expressed by $BaCe_{1-x}In_xO_3$ (x is in the same range as described above). In this mixed ionic conductor (first mixed ionic conductor), x is preferably 0.5. When the unit cell axes of the crystal are represented by a, b, and c ($a \geq b \geq c$), a is preferably 0.40 nm to 0.50 nm.

In the mixed ionic conductor of the present invention, p may be more than 1 and not more than 1.02. This mixed ionic conductor (second mixed ionic conductor) is a perovskite oxide having a composition expressed by $Ba(Ce_{1-x}In_x)_pO_3$ (x and p are in the same range as described above).

In a preferred embodiment of the mixed ionic conductor of the present invention, the perovskite oxide is substantially a single-phase polycrystal, and the crystal system of the polycrystal is a cubic system, a tetragonal system, or an orthorhombic system. When the unit cell axes of the crystal system are represented by a, b, and c ($a \geq b \geq c$), a is more than 0.43 nm and less than 0.44 nm, and b/a is not less than 0.99. This configuration can achieve an interatomic distance suitable for ionic conduction and a chemically and physically stable crystal structure. In this case, "substantially" indicates a proportion of 50 mass % or more, and the same is true in the following.

It is preferable that the perovskite oxide conducts at least one selected from the group consisting of oxygen ions, oxide ions, and protons. Thus, the mixed ionic conductor of the present invention can have superior conductivity.

It is preferable that the perovskite oxide is substantially a single-phase sintered body, and the density of the sintered body is not less than 96% of a calculated density. The calculated density is determined from a lattice constant.

It is preferable that the perovskite oxide is substantially a single-phase sintered body, and the average particle size of the sintered body is 1 µm to 30 µm. The average particle size is an average particle diameter of the particles that constitute the sintered body.

According to the preferred embodiment, the resistance of the mixed ionic conductor to moisture and thermal shock can be improved by controlling the density or average particle size of the sintered body.

At least one element selected from the group consisting of Al, Si, Zr, and Ti may be added further to the crystalline compound. In this case, the proportion of the added element is more than 0 atomic % and not more than 0.5 atomic % with respect to 100 atomic % of the perovskite oxide (third mixed ionic conductor). The added element is not taken into account when calculating a stoichiometric ratio. That is, the added element is not present in the crystal lattice, but can be a composition. With this configuration, the chemical and physical stability of the mixed ionic conductor can be improved further.

In another preferred embodiment of the mixed ionic conductor (fourth mixed ionic conductor) of the present invention, the perovskite oxide is substantially a single-phase polycrystal, and the crystal system of the polycrystal is a cubic system, a tetragonal system, or an orthorhombic system. When the unit cell axes of the crystal system are represented by a, b, and c (a≧b≧c), a is more than 0.43 nm and less than 0.44 nm, and b/a is not less than 0.99.

The mixed ionic conductor of the present invention can be produced basically by any conventional methods that have been used to produce a mixed ionic conductor of a perovskite oxide. Specifically, the conventional methods include, e.g., a solid-state reaction, coprecipitation, nitration, and spray granulation. The shape of the oxide is not limited to a bulk form, and may be a film. In such a case, CVD, sputtering, thermal spraying, or laser ablation also can be used.

As described above, the mixed ionic conductor of the present invention includes a perovskite oxide of Ba, Ce, and In. The perovskite oxide is a crystalline compound expressed by $Ba(Ce_{1-x}In_x)_pO_3$, where x is 0.4 to 0.6 and p is 1 to 1.02. This mixed ionic conductor has high conductivity and reliability and can be used for an electrochemical device.

Hereinafter, the mixed ionic conductor of the present invention will be described in detail by way of specific examples. However, the mixed ionic conductor of the present invention is not limited to the following examples.

EXAMPLE 1

Example 1 describes mixed ionic conductors. The mixed ionic conductors of this example include the first mixed ionic conductor, the second mixed ionic conductor, the third mixed ionic conductor, and the mixed ionic conductor that conducts any one of oxygen ions, oxide ions, and protons.

A mixed ionic conductor was produced by a solid-state reaction. First, powder materials of barium acetate, cerium oxide, and indium oxide each were weighed in a predetermined amount. Then, the powder materials were crushed and mixed in an agate mortar using an ethanol solvent. After mixing the powder materials sufficiently, the solvent was evaporated, and the mixture was degreased with a burner. Again, the mixture was repeatedly crushed and mixed in the agate mortar. Next, the resultant mixture was press-formed to have a cylindrical shape, and then was fired at 1200° C. for 10 hours. The fired substance was crushed into coarse grains, which subsequently were pulverized into small particles having an average particle size of about 3 µm by a planetary ball mill using a benzene solvent. Moreover, the resultant powder was dried in vacuum at 150° C., formed into a cylinder with a cold isostatic press of 2000 kg/cm², and immediately fired at 1650° C. for 10 hours, thus providing a sintered body as a mixed ionic conductor. This mixed ionic conductor was a cylindrical sintered body having a diameter of 13 mm and a height of 10 mm.

In this manner, the sintered bodies with the following 13 compositions were produced. The + sign indicates the addition of an element (the same is true for the other examples).

(1) $BaCe_{0.75}In_{0.25}O_3$
(2) $BaCe_{0.6}In_{0.4}O_3$
(3) $BaCe_{0.5}In_{0.5}O_3$
(4) $BaCe_{0.4}In_{0.6}O_3$
(5) $BaCe_{0.25}In_{0.75}O_3$
(6) $Ba(Ce_{0.5}In_{0.5})_{1.02}O_3$
(7) $Ba(Ce_{0.6}In_{0.4})_{1.01}O_3$
(8) $Ba(Ce_{0.6}In_{0.4})_{1.03}O_3$
(9) $BaCe_{0.5}In_{0.5}O_3+Zr_{0.01}$
(10) $BaCe_{0.5}In_{0.5}O_3+Al_{0.02}$
(11) $BaCe_{0.4}In_{0.6}O_3+Ti_{0.01}$
(12) $BaCe_{0.5}In_{0.5}O_3+Si_{0.02}$
(13) $BaCe_{0.5}In_{0.5}O_3+Al_{0.2}$

All the sintered bodies were dense, and the density was not less than 96% of a calculated density. Thus, they were substantially single-phase perovskite oxides. The cross-sectional observation of the sintered bodies with a scanning electron microscope (SEM) showed that the particle size was 1 to 30 µm, and the average particle size was 10 µm.

To study the conductivity, each of the sintered bodies was processed into a disk (0.5 mm thick×13 mm diameter), and a platinum electrode was baked on both sides of the disk. The conductivity of the disk-shaped sintered body provided with the electrodes was measured in (1) air, (2) nitrogen gas, and (3) atmosphere containing 3 vol % of hydrogen gas +97 vol % of nitrogen gas at 300° C. or 500° C. The measurement showed that all the sintered bodies had conductivity in air and the hydrogen atmosphere. For comparison, the conductivity of a conventional material ($BaZr_{0.4}Ce_{0.4}In_{0.2}O_3$) was evaluated in the same manner as described above. Table 1 shows the conductivity of each of the sintered bodies measured in (3) atmosphere containing 3 vol % of hydrogen gas+97 vol % of nitrogen gas at 500° C. or 300° C. The values of the conductivity in (1) air and (2) nitrogen gas were almost the same.

As shown in Table 1, the conductivity of $BaCe_{0.6}In_{0.4}O_3$, $BaCe_{0.5}In_{0.5}O_3$, and $BaCe_{0.4}In_{0.6}O_3$ was approximately an order of magnitude higher than that of the conventionally known $BaZr_{0.4}Ce_{0.4}In_{0.2}O_3$. FIG. 1 is an Arrhenius plot showing the conductivity of a typical sintered body. The conductivity was measured by a four-terminal alternating-current impedance method.

Next, a gas concentration cell or electrochemical pump was fabricated to confirm that the conductivity resulted from the conduction of oxygen ions, oxide ions, or protons.

The conduction of protons was evaluated by using a hydrogen pump. Specifically, a voltage was applied between the electrodes of each of the sintered bodies while the positive electrode was in a hydrogen atmosphere and the negative electrode was in an argon atmosphere to study hydrogen that was drawn out of the negative electrode. Consequently, hydrogen was drawn out with nearly 100% efficiency. Thus, all the sintered bodies conducted the protons.

The conduction of oxygen ions and oxide ions was evaluated by using an oxygen concentration cell. Specifically, oxygen partial pressures, e.g., 101,325 Pa and 10,132.5 Pa were applied to the respective electrodes connected by the ionic conductor, and the value of electromotive force agreed with the Nernst equation (Equation 1) expressed by $$E = -\frac{RT}{nF}\ln\frac{[Po_1]}{[Po_2]} \quad \text{Equation 1}$$

where E is an electric potential, R is a gas constant, T is an absolute temperature, F is a Faraday constant, $[Po_1]$ is a partial pressure 1 of an oxidant, and $[Po_2]$ is a partial pressure 2 of the oxidant. Thus, the sintered bodies conducted the oxygen ions and the oxide ions.

Therefore, the above sintered bodies proved to be mixed ionic conductors.

Moreover, the moisture resistance of each of the sintered bodies was evaluated. Specifically, the sintered bodies were observed visually under high temperature (85° C.) and high humidity (85% RH) conditions. Table 1 shows the results of the moisture resistance of the sintered bodies.

The visual observation is described in detail below. After about 100 hours, white particles, which were considered to be barium carbonate generated by decomposition, were precipitated from the surfaces of $BaCe_{0.75}In_{0.25}O_3$ and $BaCe_{0.25}In_{0.75}O_3$. After about 200 hours, there was a change in the surface of $BaCe_{0.6}In_{0.4}O_3$. The surfaces of $BaCe_{0.5}In_{0.5}O_3$ and $BaCe_{0.4}In_{0.6}O_3$ were hardly changed even after about 1000 hours had passed. In particular, no precipitation of particles from the surface of $BaCe_{0.5}In_{0.5}O_3$ was observed even after 3000 hours or more had passed.

EXAMPLE 2

Example 2 describes mixed ionic conductors. The mixed ionic conductors of this example include the fourth mixed ionic conductor and the mixed ionic conductor that conducts any one of oxygen ions, oxide ions, and protons.

A mixed ionic conductor was produced by a solid-state reaction. First, powder materials of barium acetate, cerium oxide, indium oxide, and a substitution element each were weighed in a predetermined amount. Then, the powder materials were crushed and mixed in an agate mortar using an ethanol solvent. After mixing the powder materials sufficiently, the solvent was evaporated, and the mixture was degreased with a burner. The mixture further was crushed by a ball mill so that the materials were mixed more sufficiently. Next, the resultant mixture was press-formed to have a cylindrical shape, and then was fired at 1200° C. for 10 hours. The fired substance was crushed into coarse grains, which subsequently were pulverized into small particles having an average particle size of about 3 μm by a planetary ball mill using a benzene solvent. Moreover, the resultant powder was dried in vacuum at 150° C., formed into a cylinder with a cold isostatic press of 2000 kg/cm², and immediately fired at 1650° C. for 10 hours, thus providing a sintered body as a mixed ionic conductor.

In this manner, the sintered bodies with 20 compositions were produced by varying each of the powder materials of barium acetate, cerium oxide, indium oxide, and a substitution element.

TABLE 1

| Oxide composition | Conductivity 500° C. (S/cm) | Evaluation | 300° C. (S/cm) | Evaluation | Moisture resistance |
|---|---|---|---|---|---|
| $BaZr_{0.4}Ce_{0.4}In_{0.2}O_3$ (conventional material) | $0.2 \times 10^{-2}$ | — | $0.08 \times 10^{-3}$ | — | 1000 hours or more |
| $BaCe_{0.75}In_{0.25}O_3$ | $1.1 \times 10^{-2}$ | 5.5 times | $0.6 \times 10^{-3}$ | 7.5 times | 100 hours |
| $BaCe_{0.6}In_{0.4}O_3$ | $1 \times 10^{-2}$ | 5 times | $1.2 \times 10^{-3}$ | 15 times | 200 hours |
| $BaCe_{0.5}In_{0.5}O_3$ | $1 \times 10^{-2}$ | 5 times | $1 \times 10^{-3}$ | 12.5 times | 1000 hours or more |
| $BaCe_{0.4}In_{0.6}O_3$ | $0.9 \times 10^{-2}$ | 4.5 times | $0.8 \times 10^{-3}$ | 10 times | 1000 hours or more |
| $BaCe_{0.25}In_{0.75}O_3$ | $0.6 \times 10^{-2}$ | 3 times | $0.2 \times 10^{-3}$ | 25 times | 1000 hours or more |
| $Ba(Ce_{0.5}In_{0.5})_{1.02}O_3$ | $1 \times 10^{-2}$ | 5 times | $0.9 \times 10^{-3}$ | 11.25 times | 1000 hours or more |
| $Ba(Ce_{0.6}In_{0.4})_{1.01}O_3$ | $0.9 \times 10^{-2}$ | 4.5 times | $0.8 \times 10^{-3}$ | 10 times | 1000 hours or more |
| $Ba(Ce_{0.6}In_{0.4})_{1.03}O_3$ | $0.7 \times 10^{-2}$ | 3.5 times | $0.5 \times 10^{-3}$ | 6.25 times | 1000 hours or more |
| $BaCe_{0.5}In_{0.5}O_3 + Zr_{0.01}$ | $0.9 \times 10^{-2}$ | 4.5 times | $0.9 \times 10^{-3}$ | 11.25 times | 1000 hours or more |
| $BaCe_{0.5}In_{0.5}O_3 + Al_{0.02}$ | $0.8 \times 10^{-2}$ | 4 times | $0.8 \times 10^{-3}$ | 10 times | 1000 hours or more |
| $BaCe_{0.4}In_{0.6}O_3 + Ti_{0.01}$ | $0.8 \times 10^{-2}$ | 4 times | $0.8 \times 10^{-3}$ | 10 times | 1000 hours or more |
| $BaCe_{0.5}In_{0.5}O_3 + Si_{0.02}$ | $0.8 \times 10^{-2}$ | 4 times | $0.8 \times 10^{-3}$ | 10 times | 1000 hours or more |
| $BaCe_{0.5}In_{0.5}O_3 + Al_{0.2}$ | $0.7 \times 10^{-2}$ | 3.5 times | $0.4 \times 10^{-3}$ | 5 times | 1000 hours or more |

According to Table 1, the perovskite oxides having the compositions in the range of the present invention exhibited high conductivity and moisture resistance. These perovskite oxides also were confirmed to conduct at least one selected from oxygen ions, oxide ions, and protons.

All the sintered bodies were dense, and the density was not less than 96% of a calculated density. Thus, they were substantially single-phase polycrystals. The cross-sectional observation of the sintered bodies with a SEM showed that the particle size was 1 to 30 μm. The lattice constant, conductivity, and moisture resistance of each of the sintered bodies were analyzed. The conductivity and the moisture resistance were evaluated in the same manner as Example 1.

Figure 2:
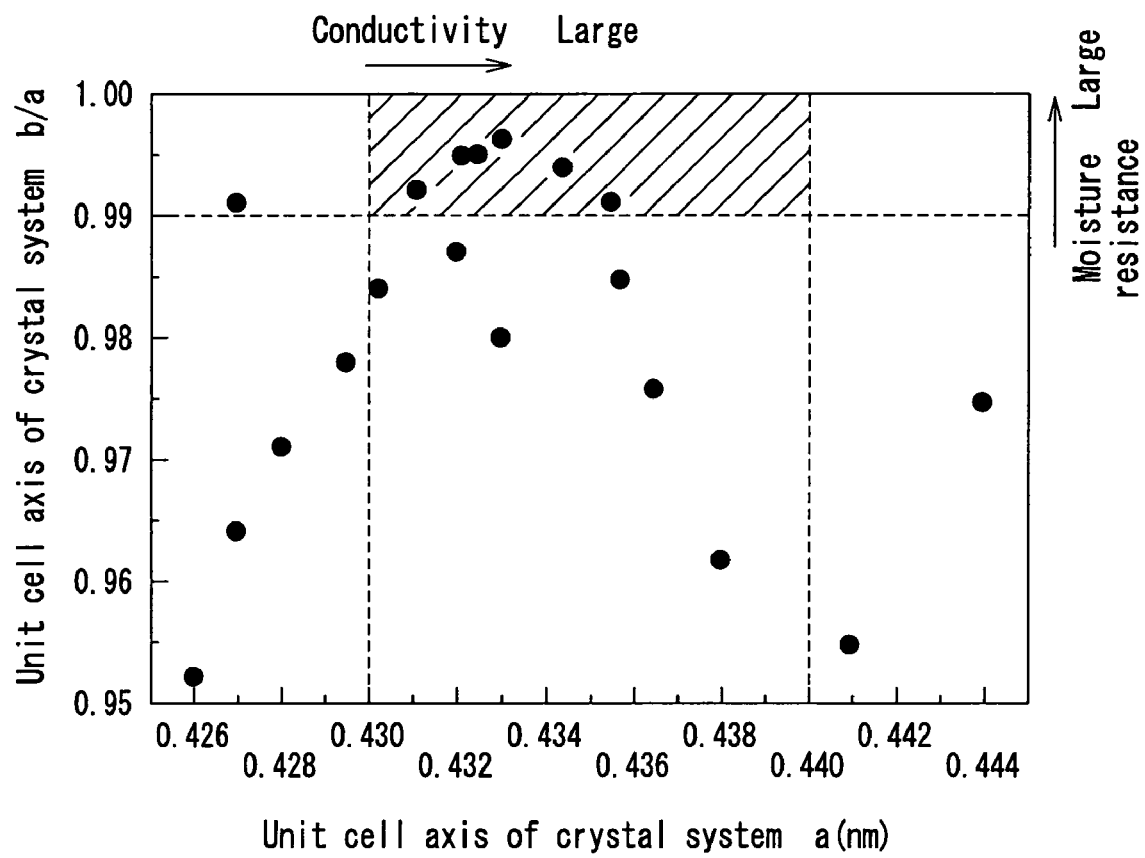
FIG. 2 shows the relationship between a lattice constant, conductivity, and moisture resistance in an embodiment of a mixed ionic conductor of the present invention.

The crystal system of each of the sintered bodies was a cubic system, a tetragonal system, or an orthorhombic system. FIG. 2 shows the results of the lattice constant, conductivity, and moisture resistance of the 20 types of sintered bodies. Table 2 shows the lattice constant of some of the sintered bodies.

TABLE 2

| Oxide composition | a (nm) | b/a | Conductivity | Moisture resistance |
|---|---|---|---|---|
| $BaCe_{0.75}In_{0.25}O_3$ | 0.4365 | 0.976 | ○ | X |
| $BaCe_{0.6}In_{0.4}O_3$ | 0.4344 | 0.994 | ○ | ○ |
| $BaCe_{0.5}In_{0.5}O_3$ | 0.4325 | 0.995 | ○ | ○ |
| $BaCe_{0.4}In_{0.6}O_3$ | 0.4311 | 0.992 | ○ | ○ |
| $BaCe_{0.25}In_{0.75}O_3$ | 0.4302 | 0.984 | X | ○ |

Conductivity evaluation
○: The conductivity was not less than 10 times that of a conventional material.
X: The conductivity was less than 10 times that of a conventional material.
Moisture resistance evaluation
○: The surface of the sintered body was not changed after 1000 hours or more.
X: The surface of the sintered body was changed after 100 hours or less.

In FIG. 2, the hatched portion indicates that not only moisture resistance but also conductivity are particularly high. According to FIG. 2, therefore, when the unit cell axes of the crystal system are represented by a, b, and c ($a \geq b \geq c$), and 0.43 nm<a<0.44 nm and $b/a \geq 0.99$, the perovskite oxides having the compositions of the present invention exhibited particularly high conductivity and moisture resistance. These perovskite oxides also were confirmed to conduct any one of oxygen ions, oxide ions, and protons.

EXAMPLE 3

In this example, a mixed ionic conductor was produced by a solid-state reaction. First, powder materials of barium acetate, cerium oxide, indium oxide, and a substitution element each were weighed in a predetermined amount. Then, the powder materials were crushed and mixed in an agate mortar using an ethanol solvent. After mixing the powder materials sufficiently, the solvent was evaporated, and the mixture was degreased with a burner. The mixture further was crushed by a ball mill so that the materials were mixed more sufficiently. In this case, balls with a diameter of 4 mm (φ4 mm) or less were used as a grinding medium of the ball mill.

Next, the resultant mixture was press-formed to have a cylindrical shape, and then was fired at 1200° C. to 1300° C. for 10 hours. The fired substance was crushed into coarse grains, which subsequently were pulverized into small particles having an average particle size of about 3 μm by a planetary ball mill using a benzene solvent. Moreover, the resultant powder was dried in vacuum at 150° C., formed into a cylinder with a cold isostatic press of 2000 kg/cm², and immediately fired at 1600° C. to 1650° C. for 10 hours, thus providing a sintered body as a mixed ionic conductor. The sintered body had a density that was not less than 96% of a theoretical density. The X-ray analysis and the X-ray fluorescence analysis showed that the sintered body was substantially single-phase perovskite oxide.

Another sintered body having the same composition was produced by the same method as described above except that ball mill crushing was not performed, thus providing a mixed ionic conductor.

In this manner, the sintered bodies with the following 9 compositions were produced.
(1) $BaCe_{0.6}In_{0.4}O_3$
(2) $BaCe_{0.5}In_{0.5}O_3$
(3) $BaCe_{0.4}In_{0.6}O_3$
(4) $Ba(Ce_{0.5}In_{0.5})_{1.02}O_3$
(5) $Ba(Ce_{0.6}In_{0.4})_{1.01}O_3$
(6) $BaCe_{0.5}In_{0.5}O_3 + Zr_{0.01}$
(7) $BaCe_{0.5}In_{0.5}O_3 + Al_{0.02}$
(8) $BaCe_{0.4}In_{0.6}O_3 + Ti_{0.01}$
(9) $BaCe_{0.5}In_{0.5}O_3 + Si_{0.02}$ The density of each of the sintered bodies was less than 96% of a calculated density.

Moreover, the moisture resistance of each of the sintered bodies was evaluated. Specifically, the sintered bodies were observed visually under high temperature (85° C.) and high humidity (85% RH) conditions. Table 3 shows the results of the moisture resistance of the sintered bodies. When the density was not less than 96%, the surface of the sintered body was not changed or altered after being left for 1000 hours. In contrast, when the density was less than 96%, the surface of the sintered body was decomposed or became whiter within several hundred to 1000 hours.

TABLE 3

| Oxide composition | Actual/calculated density ratio | Moisture resistance (time when any visual change occurred) |
|---|---|---|
| $BaCe_{0.6}In_{0.4}O_3$ | 96.1% | 1000 hours or more |
| | 94.0% | 150 hours |
| $BaCe_{0.5}In_{0.5}O_3$ | 97.2% | 1000 hours or more |
| | 95.6% | 760 hours |
| $BaCe_{0.4}In_{0.6}O_3$ | 98.2% | 1000 hours or more |
| | 95.5% | 400 hours |
| $Ba(Ce_{0.5}In_{0.5})_{1.02}O_3$ | 96.8% | 1000 hours or more |
| | 95.6% | 820 hours |
| $Ba(Ce_{0.6}In_{0.4})_{1.01}O_3$ | 97.2% | 1000 hours or more |
| | 94.2% | 210 hours |
| $BaCe_{0.5}In_{0.5}O_3 + Zr_{0.01}$ | 96.5% | 1000 hours or more |
| | 95.3% | 800 hours |
| $BaCe_{0.5}In_{0.5}O_3 + Al_{0.02}$ | 97.3% | 1000 hours or more |
| | 94.6% | 840 hours |
| $BaCe_{0.4}In_{0.6}O_3 + Ti_{0.01}$ | 96.1% | 1000 hours or more |
| | 95.7% | 410 hours |
| $BaCe_{0.5}In_{0.5}O_3 + Si_{0.02}$ | 97.7% | 1000 hours or more |
| | 95.4% | 900 hours |

The X-ray analysis and the X-ray fluorescence analysis showed that the sintered bodies thus produced were substantially single-phase perovskite oxides.

According to Table 3, the perovskite oxides having the compositions of the present invention exhibited high moisture resistance and reliability when the density was not less than 96% of the calculated value.

EXAMPLE 4

In this example, a mixed ionic conductor was produced by a solid-state reaction. First, powder materials of barium acetate, cerium oxide, indium oxide, and a substitution element each were weighed in a predetermined amount. Then, the powder materials were crushed and mixed in an agate mortar using an ethanol solvent. After mixing the powder materials sufficiently, the solvent was evaporated, and the mixture was degreased with a burner. The mixture further was crushed by a ball mill so that the materials were mixed more sufficiently. In this case, balls with a diameter of 4 mm (φ4 mm) or less were used as a grinding medium of the ball mill.

Next, the resultant mixture was press-formed to have a cylindrical shape, and then was fired at 1200° C. to 1300° C. for 10 hours. The fired substance was crushed into coarse grains, which subsequently were pulverized into small particles having an average particle size of about 3 μm by a planetary ball mill using a benzene solvent. In this case, balls with a diameter of 10 mm (φ10 mm) or more were used as a grinding medium of the ball mill. Moreover, the resultant powder was dried in vacuum at 150° C., formed into a cylinder with a cold isostatic press of 2000 kg/cm², and immediately fired at 1600° C. to 1650° C. for 10 hours, thus providing a sintered body as a mixed ionic conductor. The sintered body was substantially single-phase perovskite oxide and had an average particle size of 1 μm to 30 μm.

Another sintered body having the same composition was produced by the same method as described above except that the temperature of the second firing process was changed to 1675° C., thus providing a mixed ionic conductor. Although the sintered body thus produced was dense, the grain growth was likely to occur and increase the particle size to 100 μm.

Still another sintered body having the same composition was produced by the same method as described above except that the temperature of the second firing process was changed to 1500° C., thus providing a mixed ionic conductor. The sintered body thus produced was inadequate because the particles before firing were aggregated.

In this manner, the sintered bodies with the following 9 compositions were produced.

(1) $BaCe_{0.6}In_{0.4}O_3$
(2) $BaCe_{0.5}In_{0.5}O_3$
(3) $BaCe_{0.4}In_{0.6}O_3$
(4) $Ba(Ce_{0.5}In_{0.5})_{1.02}O_3$
(5) $Ba(Ce_{0.6}In_{0.4})_{1.01}O_3$
(6) $BaCe_{0.5}In_{0.5}O_3+Zr_{0.01}$
(7) $BaCe_{0.5}In_{0.5}O_3+Al_{0.02}$
(8) $BaCe_{0.4}In_{0.6}O_3+Ti_{0.01}$
(9) $BaCe_{0.5}In_{0.5}O_3+Si_{0.02}$

The heat resistance test of each of the sintered bodies was conducted by repeating heat cycles at room temperature to 1000° C. The sintered body having an average particle size of 1 μm to 30 μm did not cause a crack or fracture even after 100 heat cycles. However, almost no sintered body having an average particle size of more than 30 μm withstood 100 heat cycles.

The X-ray analysis and the X-ray fluorescence analysis showed that the sintered bodies thus produced were substantially single-phase perovskite oxides.

As is evident from the above explanation, the perovskite oxides having the compositions of the present invention exhibited high thermal shock resistance and reliability when the average particle size was 1 μm to 30 μm.

The present invention is not limited to the compositions of each of the above examples. For example, a mixed ionic conductor may satisfy two or more conditions of a crystal system, lattice constant, density, and particle size simultaneously.

Hereinafter, examples of an electrochemical device using a mixed ionic conductor of the present invention will be described.

Figure 3:
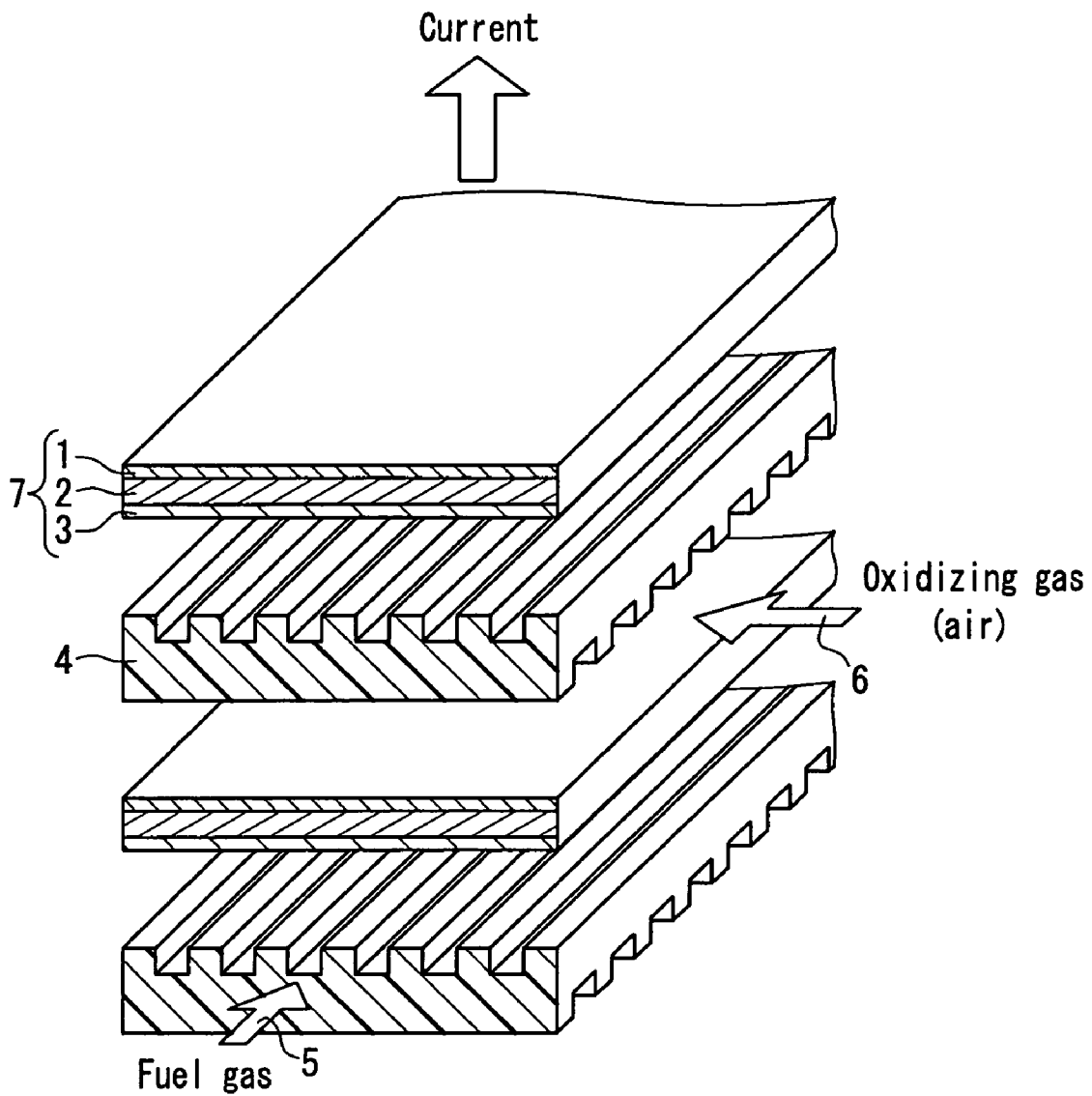
FIG. 3 is a perspective cross-sectional view showing an embodiment of a fuel cell, which is one of the electrochemical devices of the present invention.

FIG. 3 is a perspective view showing an embodiment of a fuel cell of the present invention. In this planar fuel cell, a cathode (air electrode) 1, a solid electrolyte 2, and an anode (fuel electrode) 3 are arranged in layers to constitute a layered unit 7, and a plurality of layered units 7 are formed alternately with separators 4.

At the time of generating electric power, an oxidizing gas 6 (e.g., air) is supplied to the cathode 1, and a fuel gas 5 (e.g., a reducing gas such as hydrogen or natural gas) is supplied to the anode 3. Then, electrons generated by an oxidation-reduction reaction in each of the electrodes are drawn to the outside through the solid electrolyte 2.

Figure 4:
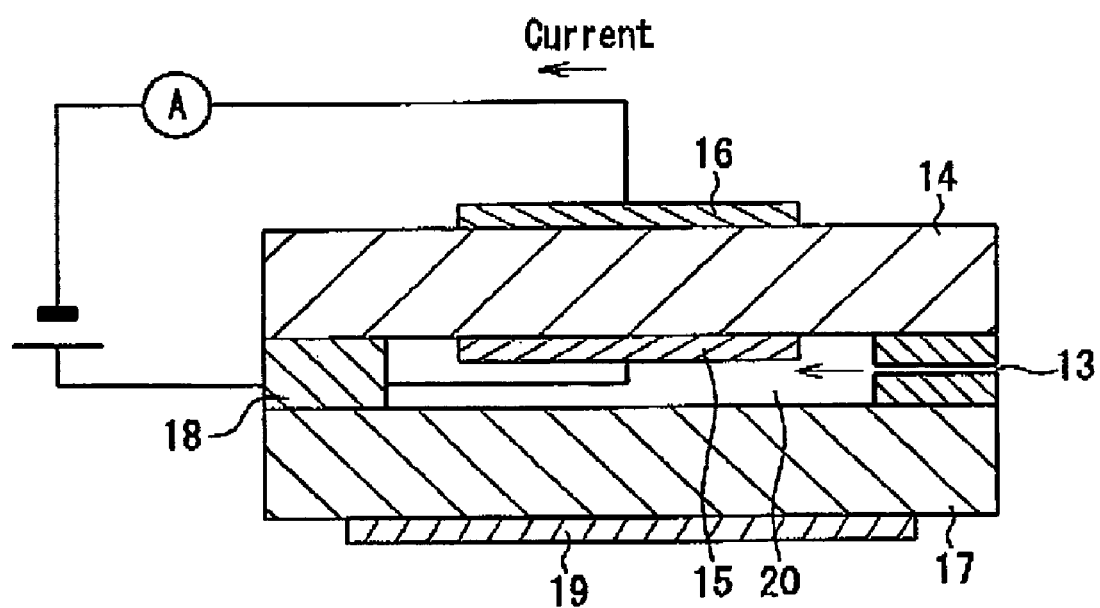
FIG. 4 is a cross-sectional view showing an embodiment of a gas sensor, which is one of the electrochemical devices of the present invention.

FIG. 4 is a cross-sectional view showing an embodiment of a gas sensor of the present invention. In this HC sensor (hydrocarbon sensor), a positive electrode 15 and a negative electrode 16 are laminated via a solid electrolyte 14. The laminate is fixed on a substrate (ceramic substrate) 17 with an inorganic adhesive 18 so that a space is present between the laminate and the substrate 17. The internal space 20 communicates with the outside through a diffusion rate-determining hole 13.

When a predetermined voltage (e.g., 1.2 V) is applied and kept between the two electrodes 15 and 16, a current is provided as output of the sensor in accordance with the concentration of hydrocarbon included in the space that is in contact with the positive electrode 15. During measurement, the sensor is maintained at a predetermined temperature by a heater 19 attached to the substrate 17. The diffusion rate-determining hole 13 limits the amount of measurement species (hydrocarbon) flowing into the internal space 20.

This embodiment is described as the HC sensor. However, it may be used as an oxygen sensor by replacing the positive electrode with the negative electrode in the configuration of FIG. 4. Moreover, a mixed ionic conductor of the present invention is not limited to the above examples and also can be applied to various kinds of electrochemical devices.

INDUSTRIAL APPLICABILITY

A mixed ionic conductor of the present invention can be used for an electrochemical device such as a fuel cell.

The invention claimed is:

1. A mixed ionic conductor comprising:
   a perovskite oxide of Ba, Ce, and In,
   wherein the perovskite oxide is a crystalline compound expressed by $Ba(Ce_{1-x}In_x)_pO_3$, where x is 0.4 to 0.6 and p is 1 to 1.02.

2. The mixed ionic conductor according to claim 1, wherein x is 0.5.

3. The mixed ionic conductor according to claim 1, wherein when unit cell axes of the crystal are represented by a, b, and c (a≧b≧c), a is 0.40 nm to 0.50 nm.

4. The mixed ionic conductor according to claim 3, wherein a is more than 0.43 nm and less than 0.44 nm.

5. The mixed ionic conductor according to claim 1, wherein when unit cell axes of the crystal are represented by a, b, and c (a≧b≧c), b/a is not less than 0.99.

6. The mixed ionic conductor according to claim 1, wherein the perovskite oxide conducts at least one selected from the group consisting of oxygen ions, oxide ions, and protons.

7. The mixed ionic conductor according to claim 1, wherein the perovskite oxide is substantially a single-phase sintered body, and a density of the sintered body is not less than 96% of a calculated density.

8. The mixed ionic conductor according to claim 1, wherein the perovskite oxide is substantially a single-phase sintered body, and an average particle size of the sintered body is 1 μm to 30 μm.

9. The mixed ionic conductor according to claim 1, wherein at least one element selected from the group consisting of Al, Si, Zr, and Ti is added further to the crystalline compound.

10. The mixed ionic conductor according to claim 9, wherein a proportion of the added element is more than 0 atomic % and not more than 0.5 atomic % with respect to 100 atomic % of the perovskite oxide.

11. The mixed ionic conductor according to claim 1, wherein the perovskite oxide is a single-phase polycrystal.

12. The mixed ionic conductor according to claim 11, wherein a crystal system of the polycrystal is a cubic system, a tetragonal system, or an orthorhombic system.

13. An electrochemical device comprising:
a mixed ionic conductor as a solid electrolyte, the mixed ionic conductor comprising a perovskite oxide of Ba, Ce, and In, wherein the perovskite oxide is a crystalline compound expressed by $Ba(Ce_{1-x}In_x)_pO_3$, where x is 0.4 to 0.6 and p is 1 to 1.02,
wherein electrons generated by an oxidation-reduction reaction are drawn in a thickness direction of the solid electrolyte.

14. The electrochemical device according to claim 13, wherein the electrochemical device is a fuel cell or a gas sensor.

15. The electrochemical device according to claim 13, wherein the perovskite oxide is a single-phase polycrystal.

* * * * *